United States Patent
Kaffl et al.

(10) Patent No.: US 12,525,853 B2
(45) Date of Patent: Jan. 13, 2026

(54) SYNCHRONOUS SAMPLING

(71) Applicant: Infineon Technologies AG, Neubiberg (DE)

(72) Inventors: Georg Kaffl, Prutting (DE); Benjamin Kollmitzer, Pörtschach am Wörther See (AT)

(73) Assignee: Infineon Technologies AG, Neubiberg (DE)

( * ) Notice: Subject to any disclaimer, the term of this patent is extended or adjusted under 35 U.S.C. 154(b) by 154 days.

(21) Appl. No.: 18/488,651

(22) Filed: Oct. 17, 2023

(65) Prior Publication Data

US 2025/0125692 A1   Apr. 17, 2025

(51) Int. Cl.
*H02K 11/27* (2016.01)
*G01B 7/30* (2006.01)
*H02K 11/215* (2016.01)
*G01R 35/00* (2006.01)

(52) U.S. Cl.
CPC ............. *H02K 11/27* (2016.01); *G01B 7/30* (2013.01); *H02K 11/215* (2016.01); *G01R 35/005* (2013.01)

(58) Field of Classification Search
None
See application file for complete search history.

(56) References Cited

U.S. PATENT DOCUMENTS

| | | | | |
|---|---|---|---|---|
| 6,324,905 | B2* | 12/2001 | Noltemeyer | G01D 5/145 73/865.9 |
| 2007/0146169 | A1* | 6/2007 | Otsuka | G01D 5/24461 341/15 |
| 2008/0157594 | A1* | 7/2008 | Peterson | H02P 9/48 307/26 |
| 2011/0031913 | A1* | 2/2011 | Mori | H02P 6/16 318/400.04 |
| 2016/0301341 | A1* | 10/2016 | Lee | B60L 3/0038 |
| 2018/0335357 | A1* | 11/2018 | Jo | B62D 5/049 |
| 2018/0367073 | A1* | 12/2018 | Haas | B62D 5/0487 |
| 2019/0170785 | A1* | 6/2019 | Riccardi | G01D 18/00 |
| 2021/0356501 | A1* | 11/2021 | Assion | G01R 21/133 |

FOREIGN PATENT DOCUMENTS

| | | |
|---|---|---|
| CN | 105656591 A | 6/2016 |
| CN | 111446890 A | 7/2020 |
| CN | 112202387 A | 1/2021 |
| CN | 113541538 A | 10/2021 |
| CN | 115913030 A | 4/2023 |
| CN | 116111905 A | 5/2023 |

* cited by examiner

*Primary Examiner* — Jas A Sanghera
(74) *Attorney, Agent, or Firm* — Harrity & Harrity, LLP

(57) ABSTRACT

A system may include a first sensor and a second sensor. The second sensor may be configured to receive a trigger associated with synchronizing sampling of a second sensor signal with sampling of a first sensor signal associated with the first sensor. The second sensor may be configured to obtain a second sample associated with a second sensor signal based on the trigger, wherein the second sample is synchronous with a first sample associated with the first sensor signal. The second sensor may be configured to transmit an output signal that includes information associated with the second sample.

11 Claims, 8 Drawing Sheets

SYNCHRONOUS SAMPLING

BACKGROUND

There are many applications in which measuring an electric current is desired. As one example, it may be desired to measure one or more electric currents of a battery system of an electric vehicle. In another example, it may be desired to measure one or more electric currents provided to a load, such as an electric motor. In yet further examples, it may be desired to measure one or more electric currents of a power distribution system or one or more electric currents in a circuit.

Because an electric current flowing through a current-carrying conductor produces a magnetic field with a magnetic field flux density that is proportional to a magnitude of the electric current, magnetic field sensors can be used as current sensors. By placing a magnetic field sensor near the current-carrying conductor, the magnetic field sensor can generate a measurable quantity, such as a voltage, that is proportional to the magnetic field sensed by the magnetic field sensor. However, the magnetic field flux density in a space around the current-carrying conductor decreases with increasing distance from the current-carrying conductor. Therefore, a sensor element of the magnetic field sensor may be placed in close proximity to the current-carrying conductor.

In addition, a magnetic field sensor may be used to sense a position of an object. As one example, a magnet may be coupled to an object of interest (e.g., a target object). As a result, if the magnetic field sensor is placed in a fixed position, a magnetic field produced by the magnet and sensed at the magnetic field sensor changes as a position of the object changes. For example, a magnetic field flux density of the magnetic field incident on the magnetic field sensor may increase as the object, along with the magnet, moves closer to the magnetic field sensor, and may decrease as the object, along with the magnet, moves farther from the magnetic field sensor. Thus, by placing the magnetic field sensor near a trajectory of the magnet, the magnetic field sensor can generate a measurable quantity, such as a voltage, that is proportional to the position of the object in connection with the magnetic field produced by the magnet.

SUMMARY

In some implementations, a system includes a first sensor; and a second sensor configured to: receive a trigger associated with synchronizing sampling of a second sensor signal with sampling of a first sensor signal associated with the first sensor, obtain a second sample associated with a second sensor signal based on the trigger, wherein the second sample is synchronous with a first sample associated with the first sensor signal, and transmit an output signal that includes information associated with the second sample.

In some implementations, a system includes a first sensor; and a second sensor configured to: receive a sampling trigger; sample a second characteristic signal based on the sampling trigger, wherein the sampling trigger causes the sample of the second characteristic signal to be synchronized with a sample of a first characteristic signal associated with the first sensor, and provide a second output signal that includes information associated with the sample of the second characteristic signal.

In some implementations, a field-oriented control (FOC) system includes a current sensor; and an angle sensor configured to: receive a trigger associated with synchronizing sampling of an angle sensor signal with sampling of a current sensor signal associated with the current sensor; sample the angle sensor signal based on the trigger, wherein the sample of the angle sensor signal is synchronous with a sample of the current sensor signal; and transmit an output signal that includes information associated with the sample of the angular sensor signal.

DETAILED DESCRIPTION

Figure 1A:
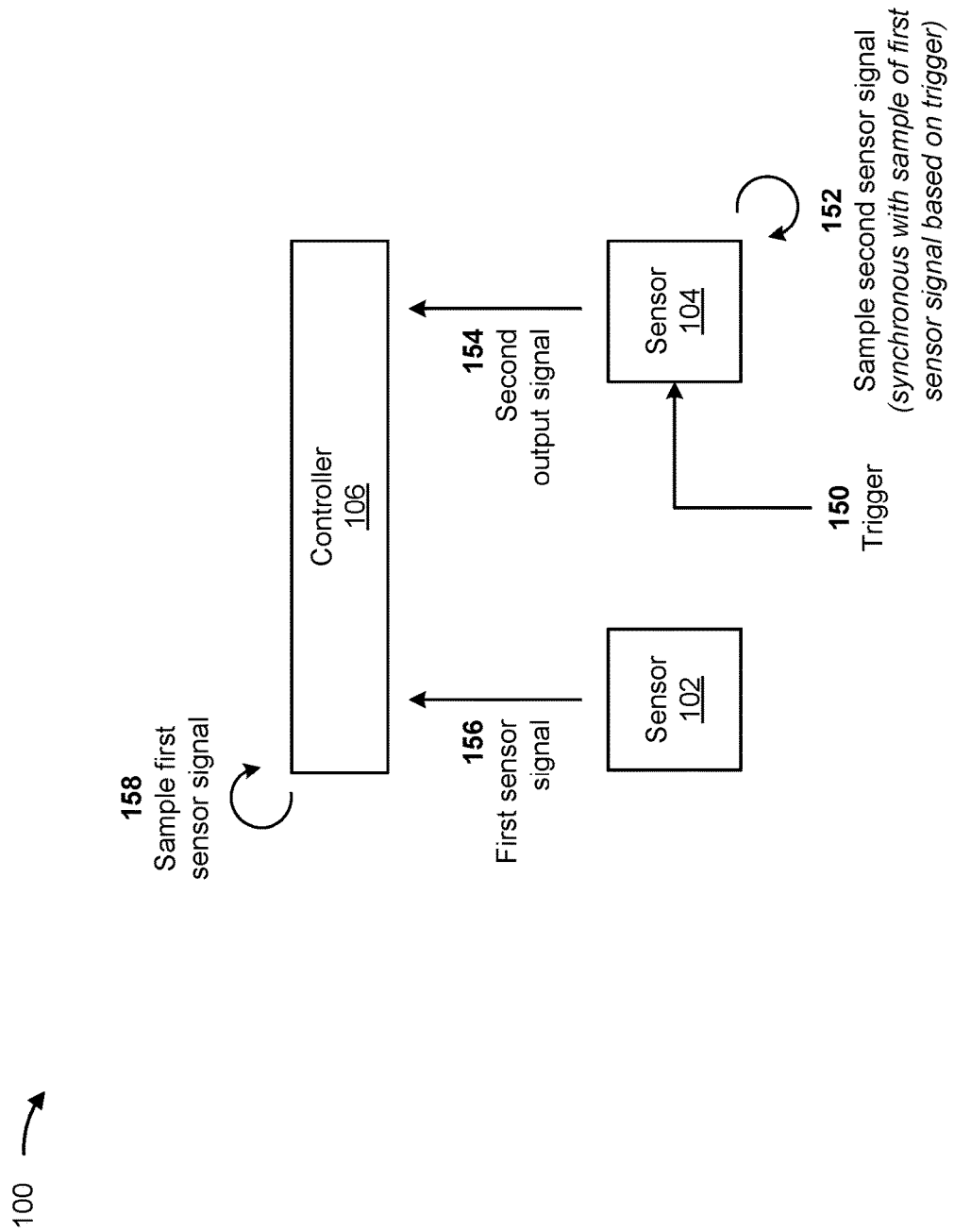
FIGS. 1A and 1B are diagrams illustrating examples associated with a system capable of performing synchronous sampling, as described herein.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

An illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

As used herein, the term "sensor" may refer to a device which converts a characteristic to be measured to an electric signal (e.g., a current signal or a voltage signal). The characteristic to be measured may, for example, comprise a magnetic field, an electric field, an electromagnetic wave (e.g., a radio wave), a pressure, a force, a current, or a voltage, but is not limited thereto. For instance, there are various sensor techniques for measuring a current flowing through a conductor or a position of an object in connection with a magnetic field, as will be described below. For example, a system may include a current-carrying conductor that carries a current to be measured. A magnetic field sensor may detect a magnetic field created by the current and generate a sensor signal that is proportional to the magnetic field. Thus, the sensor signal may be a measure for the current. As another example, a system may include a magnet coupled to a movable target object. The magnet may rotate relative to a magnetic field sensor as the moveable target object rotates about an axis of rotation (e.g., a central axis of the magnet). As the magnet rotates relative to the magnetic field sensor, strengths of components of a magnetic field produced by the magnet may change in a region of the magnetic field sensor. The magnetic field sensor may detect the components of the magnetic field produced by the magnet and generate a sensor signal that is proportional to the components of the magnetic field. Thus, the sensor signal may be a measure for an angular position of the magnet.

In some systems, synchronous sampling of multiple sensor signals is desirable. For example, in a field-oriented control (FOC) system, synchronization of sampling of sensor signals representing phase currents of an electric motor with sampling of a sensor signal representing an angular position of a rotor is important so that the FOC system can achieve optimal performance and efficiency. In such a system, if the samples associated with the phase currents and the sample associated with the angular position of the rotor are not synchronous (i.e., not captured at the same time), then performance of the FOC system will be degraded. As one example, the FOC system may suffer from inaccurate current control as a result of asynchronous sampling. A current control loop in the FOC system relies on accurate measurement of the phase currents of the electric motor. If a current measurement sample is not captured at the same time as a rotor position sample, then the current control loop will be inaccurate and may cause the electric motor to behave unpredictably. Inaccurate current control can cause, for example, torque ripple (e.g., an undesirable variation in torque produced by the electric motor), which can result in mechanical vibrations and noise, reduce efficiency, and decrease the lifespan of the electric motor. Inaccurate current control can also cause the FOC system to be unstable, which can result in oscillation or even stalling of the electric motor. This instability can be particularly problematic at high speeds or when the electric motor is subjected to a sudden change in load or direction. Inaccurate current control can also cause the electric motor to consumer more power than necessary, which can lead to overheating and damage to parts of the electric motor, such windings or insulation.

As another example, it may be desirable or required for a system to provide functional safety through, for example, achievement of a particular automotive safety integrity level (ASIL) (e.g., ASIL D). However, achievement of the particular ASIL level may in practice be costly and/or difficult in a given system. For example, a system may include two angle sensors configured to sense an angular position of a rotating target (e.g., a rotor). In such a system, a comparison of measurements from each angle sensor can be used to determine a final angular position. However, in the case of digital angle sensors, sensor signals indicative of the angular position of the target are continuously sampled by each angle sensor, meaning that sampling performed by the angle sensors are not synchronous with each other. Here, a safety check may include a comparison of measurements from the angle sensors. However, due to the asynchronous sampling, the safety check may require a relatively high comparison threshold (e.g., to account for inaccuracy caused by the asynchronous sampling, synchronization effects, or the like)

that may prevent a desired level of functional safety from being achieved. In some applications, sampling differences between the two angle sensors can be compensated for in a controller (e.g., a microcontroller (μC)). However, compensation by the controller consumes processing and power resources. Further, the controller may have a limited number of samples based on which to perform compensation. Thus, compensation of dynamic effects by the controller may not be a desirable solution.

Some implementations described herein provide techniques and apparatuses that enable a system to achieve synchronous sampling. In some implementations, a system may include a first sensor and a second sensor. The second sensor may be configured to receive a trigger associated with synchronizing sampling of a second sensor signal with sampling of a first sensor signal associated with the first sensor. The second sensor may obtain a second sample associated with the second sensor signal based on the trigger, with the second sample being synchronous with a first sample associated with the first sensor signal. The second sensor may transmit an output signal that includes information associated with the second sample.

In some implementations, the techniques and apparatuses described herein can be implemented in an FOC system and, as a result, the FOC system may can achieve improved performance and efficiency by, for example, enabling accurate current control, reducing or eliminating torque ripple, increasing stability, and reducing a likelihood of overheating and damage to an electric motor. Further, the techniques and apparatuses described herein may in some implementations enable a system to achieve a desired level of functional safety without increasing burden a controller. For example, the techniques and apparatuses described herein may enable a system including a pair of angle sensors to achieve ASIL D without a need for a controller to perform complex or burdensome compensation. Notably, in some implementations, the techniques and apparatuses described herein can enable a system to achieve a higher level of functional safety (e.g., ASIL D) using sensors that, when used alone, can achieve a lower level of functional safety (e.g., ASIL B). Additional details are provided below.

Figure 1B:
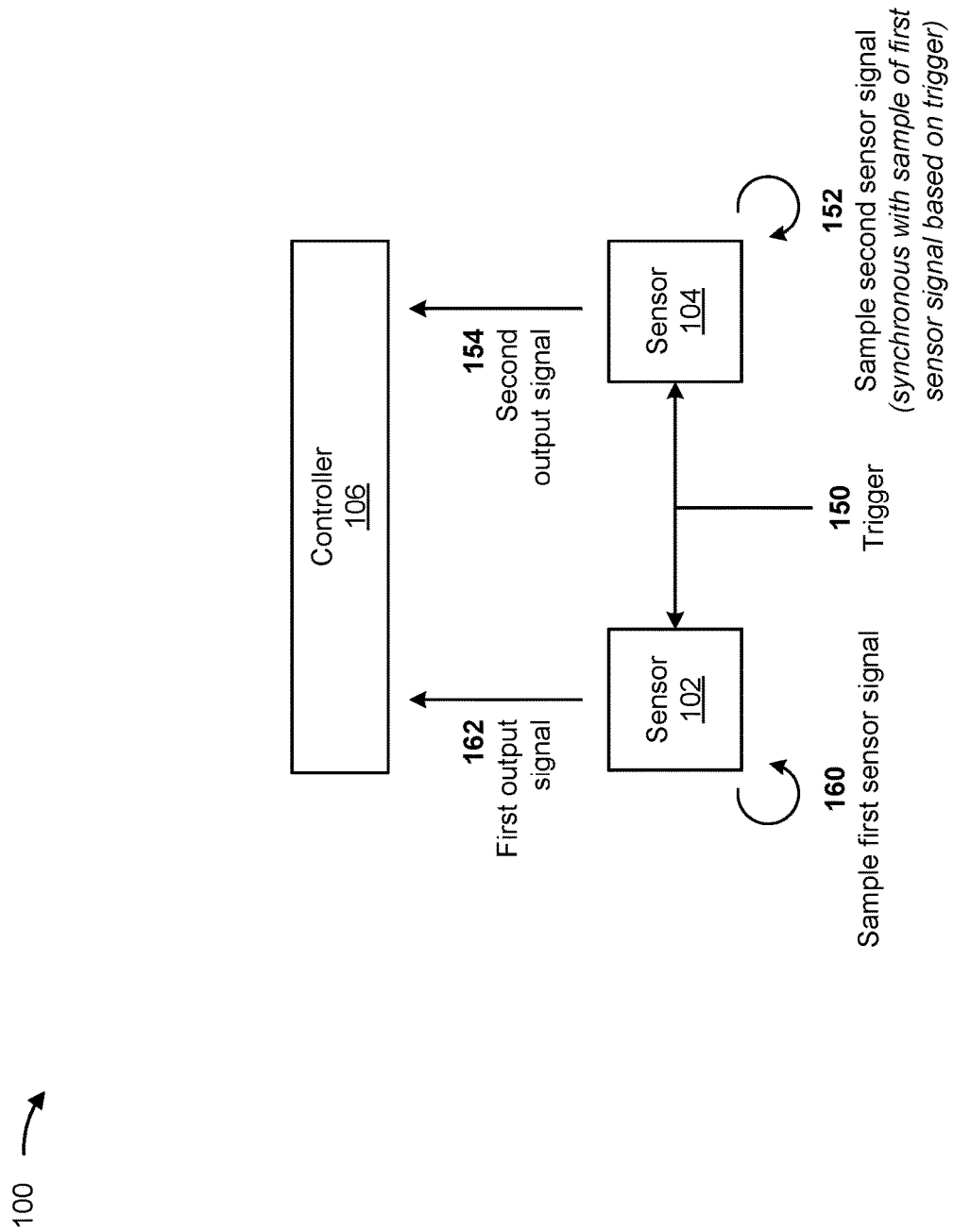

FIGS. 1A and 1B are diagrams illustrating an examples associated with a system 100 capable of performing synchronous sampling, as described herein. As shown in FIGS. 1A, the system 100 may include a sensor 102, a sensor 104, and a controller 106. In some implementations, the system 100 may be or may be included in an FOC system (e.g., a system associated with providing motor control for an electric motor). Details regarding the devices of the system 100 are provided below, followed by examples of operation of the system 100.

The sensor 102 or the sensor 104 (collectively referred to herein as sensor 102/104), may comprise one or more components capable of converting a characteristic to be measured to an electric signal (e.g., a current signal or a voltage signal). The characteristic to be measured may, for example, comprise a magnetic field, an electric field, an electromagnetic wave (e.g., a radio wave), a pressure, a force, a current, or a voltage, among other examples. In some implementations, the sensor 102 may be a current sensor (e.g., an analog current sensor or a digital current sensor) associated with measuring current in a conductor, an angle sensor (e.g., a digital angle sensor) associated with measuring an angular position of a rotatable target, or another type of sensor. In some implementations, the sensor 104 may be an angle sensor (e.g., a digital angle sensor) associated with measuring an angular position of a rotatable target, or may be another type of sensor. Additional details regarding the sensor 102/104 are described below with respect to FIG. 3.

The controller 106 may comprise one or more devices capable of controlling one or more electrical systems and/or electrical subsystems based on information provided by the sensor 102 and/or information provided by the sensor 104. The controller 106 may include, for example, a μC or an electronic control unit (ECU), among other examples. In some implementations, the controller 106 may be capable of calibrating, controlling, adjusting, and/or the like, the one or more electrical systems and/or electrical subsystems based on information received from the sensor 102. In some implementations, the controller 106 may be configured to receive a first output signal provided by the sensor 102 and to receive a second output signal provided by the sensor 104, and process the first output signal and the second output signal in association with controlling the one or more one or more electrical systems and/or electrical subsystems. In some implementations, the controller 106 is connected to the sensor 102 and to the sensor 104 such that the controller 106 can receive information (e.g., one or more signals) from the sensor 102 and the sensor 104 via one or more transmission interfaces.

Different examples of operation of system 100 are shown in FIG. 1A and 1B. As shown at reference 150 in FIGS. 1A and 1B, the sensor 104 may receive a trigger. In some implementations, the trigger is a signal associated with synchronizing sampling of a second sensor signal with sampling of a first sensor signal associated with the sensor 102. In some implementations, the sensor 104 may receive the trigger via a synchronization pin of the sensor 104 (e.g., a digital input pin). In some implementations, the synchronization pin may be dedicated to facilitating sensor synchronization (e.g., the synchronization pin may serve only to facilitate synchronous sampling).

In some implementations, the trigger may be transmitted by the controller 106. That is, in some implementations, the sensor 104 may receive the trigger from the controller 106. In one example, as shown in FIG. 1A, the sensor 102 is an analog sensor that provides a first sensor signal (e.g., an analog output signal) and the sensor 104 may be a digital sensor (e.g., a sensor that provides a digital output signal). In such an implementation, analog-to-digital conversion of the first sensor signal provided by the sensor 102 may be performed at an analog-to-digital convertor (ADC) of the controller 106. Here, a timer component (e.g., a general purpose timer (GPT), a generic timer module (GTM), or the like) of the controller 106 may be configured to provide a trigger (e.g., a pulse-width modulation (PWM) signal) that causes the ADC of the controller 106 to initiate analog-to-digital conversion of the first sensor signal (e.g., such that sampling of the first sensor signal is triggered in association with performing analog-to-digital conversion). In this example, the trigger provided by the timer component of the controller 106 can also be routed to the synchronization pin of the sensor 104 to cause the sensor 104 to sample a second sensor signal synchronous with the sampling of the first sensor signal at the ADC of the controller 106. In some implementations, the sensor 104 may be configured such that a particular type of characteristic of the trigger (e.g., a rising edge of a PWM signal, a falling edge of PWM signal, or the like) causes the sampling to be initiated at the sensor 104.

In another example, as shown in FIG. 1B, the sensor 102 is a first digital sensor and the sensor 104 is a second digital sensor. In such an implementation, analog-to-digital conversion of the first sensor signal and analog-to-digital conversion of a second sensor signal associated with the sensor 104 are performed at the sensor 102 and the sensor 104, respectively. In some implementations, a timer component (e.g., a GTP, a GTM, or the like) of the controller 106 may be configured to provide a trigger (e.g., a PWM signal) to a synchronization pin of the sensor 102 and to a synchronization pin of the sensor 104. In some such implementations, the trigger may be a signal associated with controlling another component of the system 100, such as an inverter of the system 100 (e.g., in the case of an FOC system). In some implementations, the sensor 102 and/or the sensor 104 may be configured such that a particular type of characteristic of the trigger (e.g., a rising edge of a PWM signal, a falling edge of PWM signal, or the like) causes the sampling to be initiated at the sensor 102 and the sensor 104.

Additionally, or alternatively, the trigger may, in some implementations, be transmitted by the sensor 102. For example, the sensor 102 may, in some implementations, be a first digital sensor and the sensor 104 may be a second digital sensor. In one example of such an implementation, analog-to-digital conversion of the first sensor signal is performed at an ADC of the sensor 102 and analog-to-digital conversion of the second sensor signal is performed at an ADC of the sensor 104. Here, a timer component (e.g., a GTP, a GTM, or the like) of the sensor 102 may be configured to provide a trigger (e.g., a PWM signal) that causes the ADC of the sensor 102 to initiate analog-to-digital conversion of the first sensor signal such that sampling of the first sensor signal is triggered in association with performing analog-to-digital conversion. In this example, the trigger provided by the timer component of the sensor 102 can also be routed to a synchronization pin of the sensor 104. In some implementations, the sensor 102 and/or the sensor 104 may be configured such that a particular type of characteristic of the trigger (e.g., a rising edge of a PWM signal, a falling edge of PWM signal, or the like) causes the sampling to be initiated at the sensor 102 and the sensor 104.

Additionally, or alternatively, the trigger may in some implementations be transmitted by another component of the system 100. For example, in the case of an FOC system, the trigger may in some implementations be transmitted by an inverter included in the FOC system.

As shown at reference 152 in FIGS. 1A and 1B, the sensor 104 may obtain a second sample associated with the second sensor signal based on the trigger. That is, the sensor 104 may sample the second sensor signal based on the trigger. Here, the trigger causes the second sample to be synchronous with a first sample of the first sensor signal (e.g., such that the second sample is obtained by the sensor 104 at a same point in time at which the first sample is obtained by, for example, the sensor 102 or the controller 106).

As shown at reference 154 in FIGS. 1A and 1B, the sensor 104 may transmit, and the controller 106 may receive, a second output signal that includes information associated with the second sample. For example, the sensor 104 may transmit a digital output signal that includes information associated with the second sample of the second sensor signal.

In some implementations, as shown at references 156 and 158 in FIG. 1A, the sensor 102 provides the first sensor signal (e.g., an analog output signal) and the controller 106 samples the first sensor signal (e.g., in association with performing analog-to-digital conversion). Such an implementation may be used when, for example, the sensor 102 is an analog sensor (e.g., an analog current sensor) and the sensor 104 is a digital sensor (e.g., a digital angle sensor).

Additionally, or alternatively, as shown at references 160 and 162 in FIG. 1B, the sensor 102 in some implementations samples the first sensor signal and transmits a second output signal (e.g., a digital output signal). Such an implementation may be used when, for example, the sensor 102 is a first digital sensor (e.g., a digit current sensor, a digital angle sensor, or the like) and the sensor 104 is a second digital sensor (e.g., a digital angle sensor).

In some implementations, the controller 106 may process a digital signal associated with the sensor 102 and a digital signal associated with the sensor 104 and may perform one or more operations associated with controlling the system 100, accordingly. For example, the controller 106 may receive a first digital output signal from the sensor 102 (e.g., a first digital angle sensor) and may further receive a second digital output signal from the sensor 104 (e.g., a second digital angle sensor). In this example, the controller 106 may determine a difference between an angle indicated by the first digital output signal and an angle indicated by the second digital output signal. Here, if the difference satisfies (e.g., is less than or equal to) an error threshold (e.g., 0.2 degrees (°)), then the controller 106 may determine that there is no error (e.g., that the sensor 102 and the sensor 104 are operating normally). Conversely, if the difference does not satisfy (e.g., is greater than) the error threshold, then the controller 106 may determine that there is error with respect to the sensor 102 or the sensor 104 (e.g., that at least one of the sensor 102 or the sensor 104 is not operating normally). In some implementations, the controller 106 may transmit (e.g., to another device, such as another controller) transmitting an indication of whether the difference satisfies the error threshold (i.e., whether the controller 106 has detected an error with respect to the sensor 102 or the sensor 104). In this way, the controller 106 may perform a safety check in association with achieving a desired level of functional safety with respect to a determination of an angular position of a target.

As indicated above, FIGS. 1A and 1B are provided as examples. Other examples may differ from what is described with regard to FIGS. 1A and 1B.

FIGS. 2A-2D are diagrams illustrating various example implementations of the system 100 capable of performing synchronous sampling, as described herein.

Figure 2A:
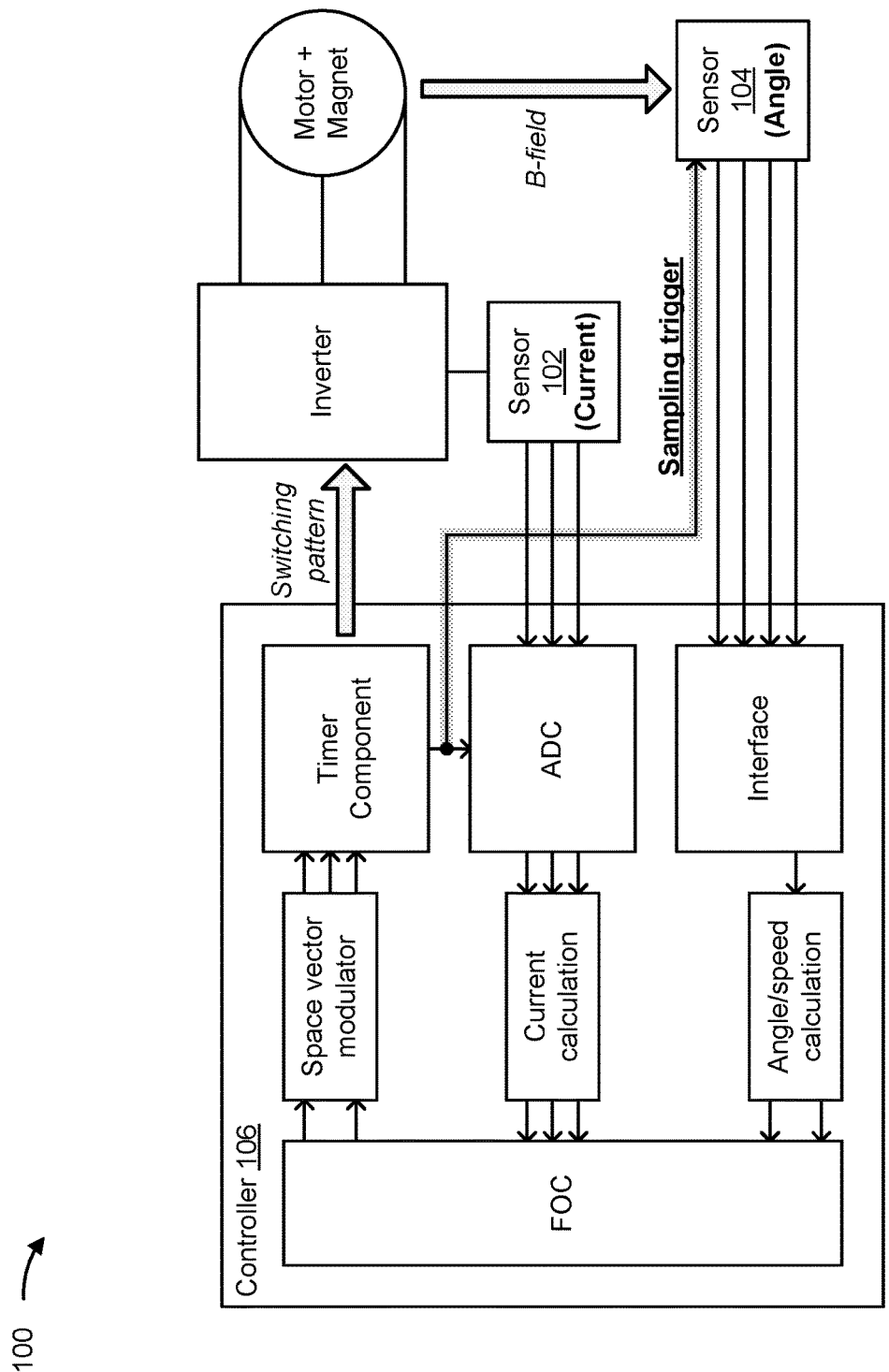
FIGS. 2A-2D are diagrams illustrating various example implementations of the system capable of performing synchronous sampling, as described herein.

FIG. 2A is a diagram illustrating an example in which the system 100 is an FOC system. In the example shown in FIG. 2A, the sensor 102 is an analog current sensor and the sensor 104 is a digital angle sensor. In this example, analog-to-digital conversion of a first sensor signal provided by the sensor 102 is performed at an ADC of the controller 106. Here, a timer component (e.g., a GPT, a GTM, or the like) of the controller 106 provides a trigger (e.g., a PWM signal) that causes the ADC of the controller 106 to initiate analog-to-digital conversion of the first sensor signal. As shown in FIG. 2A, the trigger may also be routed to a synchronization pin of the sensor 104 to cause the sensor 104 to sample a second sensor signal synchronous with the sampling of the first sensor signal at the ADC of the controller 106.

Figure 2B:
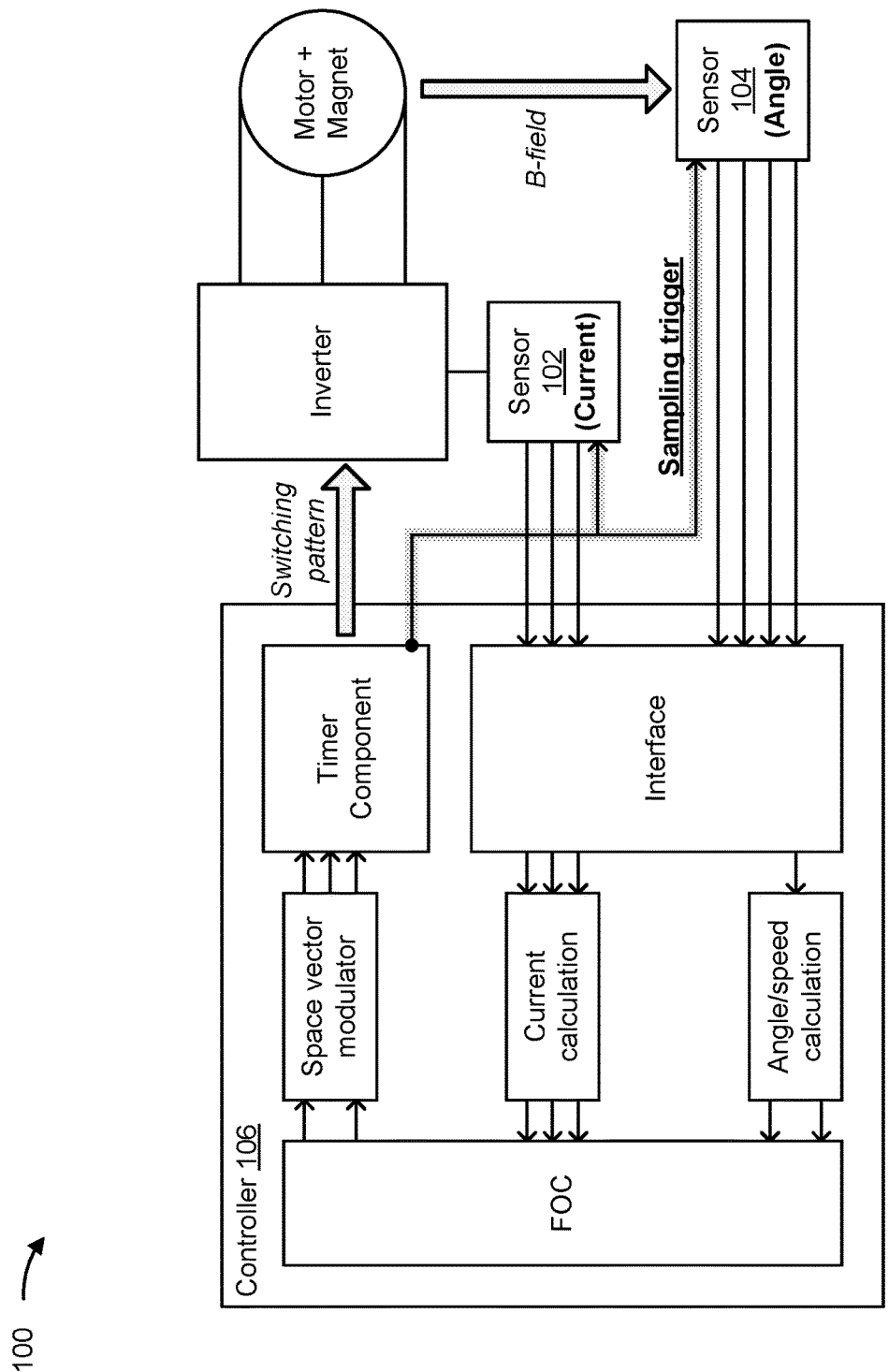

FIG. 2B is a diagram FIG. 2A is a diagram illustrating another example in which the system 100 is an FOC system. In the example shown in FIG. 2B, the sensor 102 is a digital current sensor and the sensor 104 is a digital angle sensor. In this example, analog-to-digital conversion of the first sensor signal and a second sensor signal associated with the sensor 104 are performed at the sensor 102 and the sensor 104, respectively. Here, the timer component (e.g., a GTP, a GTM, or the like) of the controller 106 is configured to provide a trigger (e.g., a PWM signal) to a synchronization pin of the sensor 102 and to a synchronization pin of the sensor 104. In some such implementations, the trigger may be a signal associated with controlling another component of the system 100, such as an inverter of the system 100. Here, the trigger causes the sensor 102 to sample the first sensor signal and the sensor 104 to sample the second sensor signal synchronously (e.g., at the same point in time).

Notably, the example implementations of the system 100 illustrated in in FIGS. 2A and 2B enable the FOC system to achieve improved performance and efficiency. For example, the synchronous sampling provided by the system 100 improves accuracy of current control of the FOC system, reduces or eliminates torque ripple in the FOC system, increases stability the FOC system, and reduces a likelihood of overheating and damage to an electric motor in the FOC system.

Figure 2C:
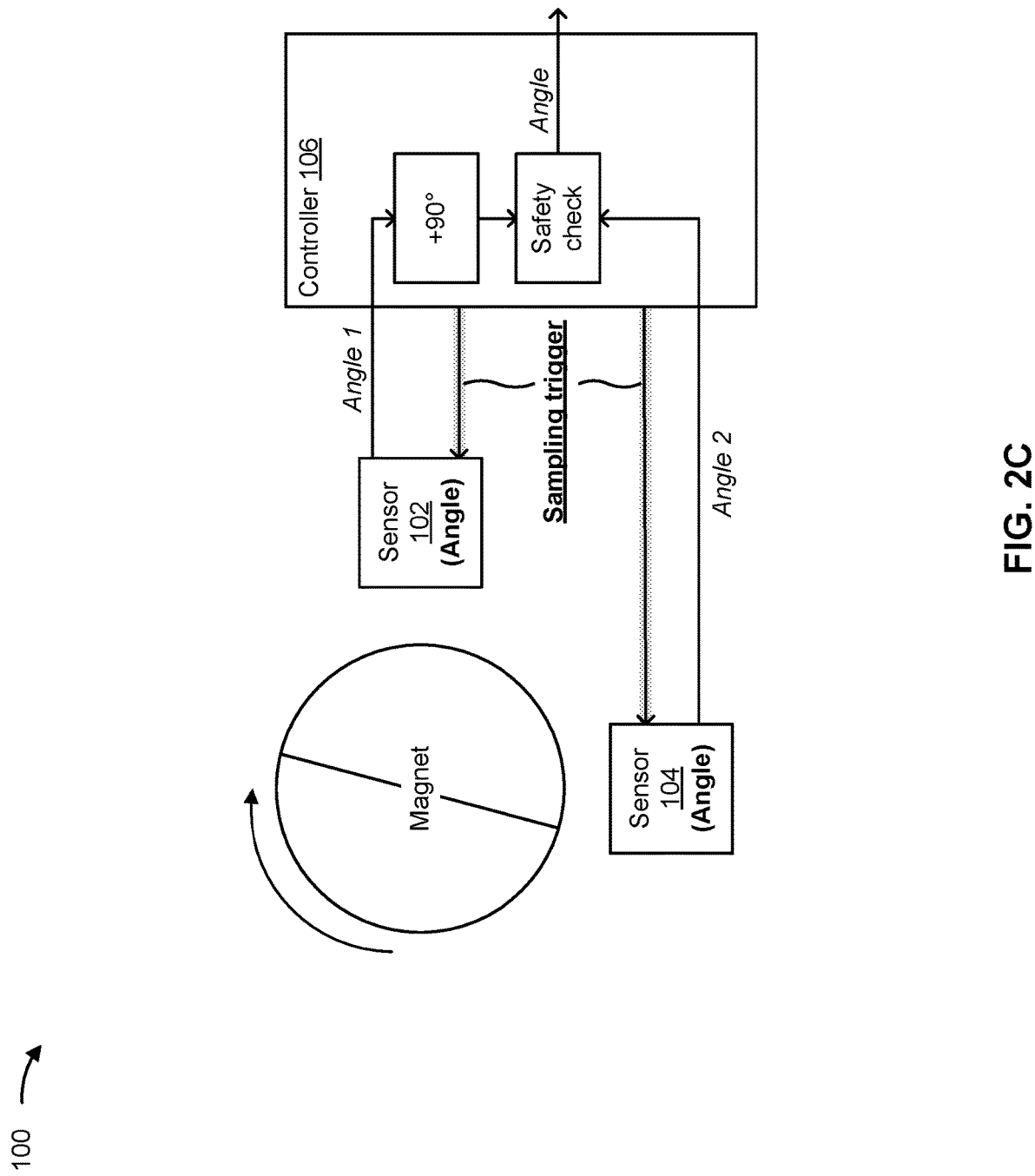

FIG. 2C is a diagram illustrating an example in which the system 100 is a multi-sensor system associated with providing functional safety. In the example shown in FIG. 2C, the sensor 102 is a first digital angle sensor and the sensor 104 is a second digital angle sensor. Here, the sensor 102 and the sensor 104 are arranged at off-axis positions relative to an axis of rotation of a rotatable magnet (e.g., a magnet affixed to a rotatable target). In this example, measurements from the sensor 102 and the sensor 104 can be used to provide a functional safety level in association with a safety check for a determination of an angular position of the target. In operation, the controller 106 provides the trigger to a synchronization pin of the sensor 102 and to a synchronization pin of the sensor 104. Here, the trigger causes the sensor 102 to sample a first sensor signal and the sensor 104 to sample a second sensor signal synchronously (e.g., at the same point in time) such that angular position measurements indicated by output signals of the sensor 102 and the sensor 104 are associated with the same time point.

Figure 2D:
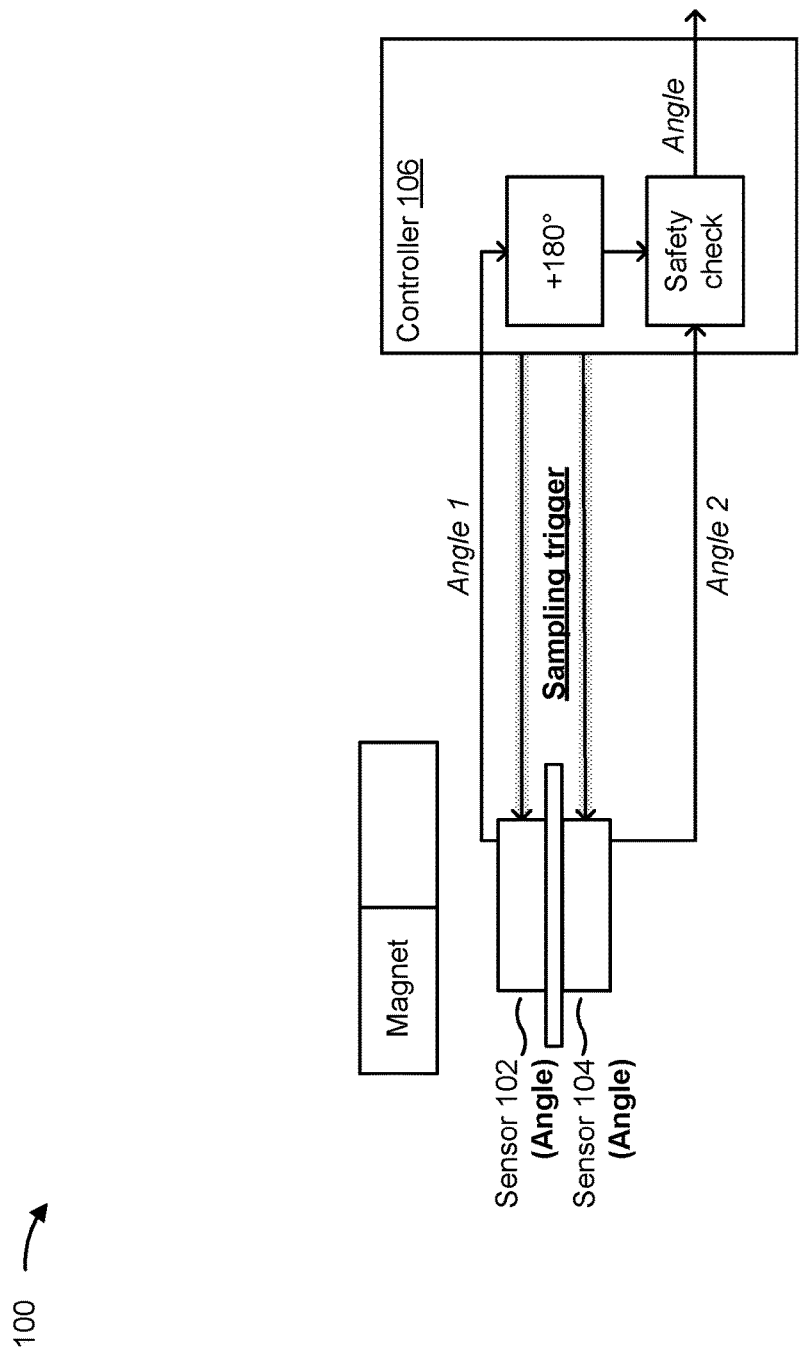

FIG. 2D is a diagram illustrating another example in which the system 100 is a multi-sensor system associated with providing functional safety. In the example shown in FIG. 2D, the sensor 102 is a first digital angle sensor and the sensor 104 is a second digital angle sensor. Here, the sensor 102 and the sensor 104 are arranged at on-axis positions relative to an axis of rotation of a rotatable magnet (e.g., a magnet affixed to a rotatable target). In this example, measurements from the sensor 102 and the sensor 104 can be used to provide a functional safety level in association with a safety check for a determination of an angular position of the target. In operation, the controller 106 provides the trigger to a synchronization pin of the sensor 102 and to a synchronization pin of the sensor 104. Here, the trigger causes the sensor 102 to sample a first sensor signal and the sensor 104 to sample a second sensor signal synchronously (e.g., at the same point in time) such that angular position measurements indicated by output signals of the sensor 102 and the sensor 104 are associated with the same time point.

Notably, the example implementations of the system 100 illustrated in in FIGS. 2C and 2D enable the system 100 to achieve a desired level of functional safety without increasing burden the controller 106. For example, the system 100 may enable the sensor 102 and the sensor 104 to achieve ASIL D without a need for the controller 106 to perform complex or burdensome compensation. Further, the system 100 enables accurate comparison of the measurement paths, which improves diagnostic coverage and reduces a probability of a fault alert. Additionally, the system 100 can achieve a higher level of functional safety (e.g., ASIL D) using sensors 102 and 104 that, when used alone, achieve a lower level of functional safety (e.g., ASIL B).

As indicated above, FIGS. 2A-2D are provided as examples. Other examples may differ from what is described with regard to FIGS. 2A-2D.

Figure 3:
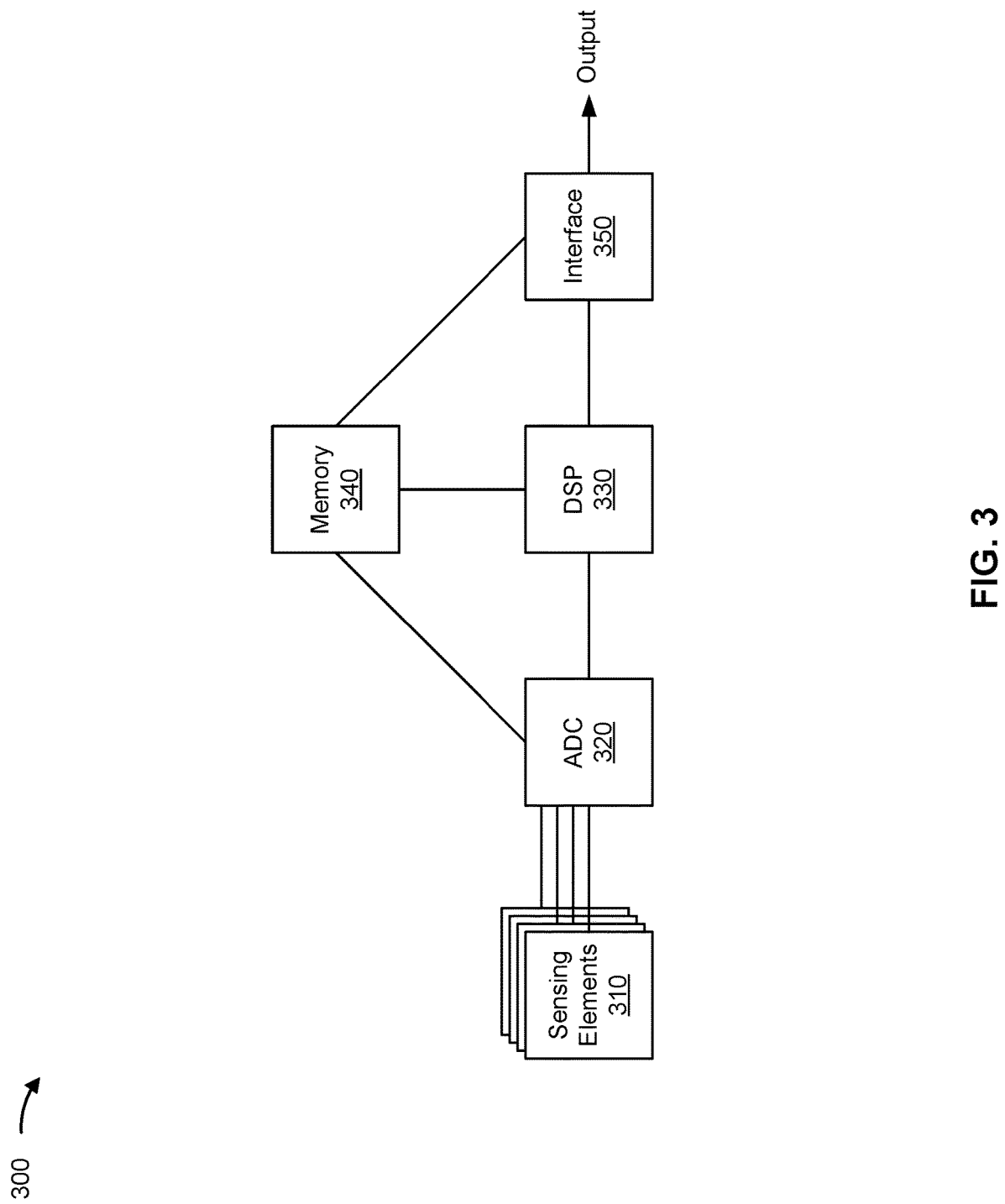
FIG. 3 is a diagram of an example magnetic field sensor according to one or more implementations.

FIG. 3 is a diagram of an example magnetic field sensor 300 according to one or more implementations. The magnetic field sensor 300 may correspond to, for example, sensor 102 and/or sensor 104, as described herein. As shown in FIG. 3, the magnetic field sensor 300 may include one or more sensing elements 310 (e.g., one or more magnetic field sensing elements), an ADC 320, a digital signal processor (DSP) 330, a memory element 340, and an interface 350.

The magnetic field sensor 300 may be a semiconductor chip (e.g., a sensor chip) that includes the one or more sensing elements 310 that measure or otherwise sense one or more characteristics of a magnetic field (e.g., an amount of magnetic field flux density, a field strength, a field angle, a field direction, a field orientation, etc.) and provide a sensor signal corresponding to the sensed characteristics of the magnetic field. For example, a sensing element 310 may be configured to generate a sensor signal (e.g., a voltage) in response to one or more magnetic fields impinging on the sensing element 310. Thus, the sensor signal is indicative of a magnitude and/or a field orientation of at least one magnetic field impinging on the sensing element 310. The semiconductor chip may further include sensor circuitry for processing and outputting one or more sensor signals generated by the one or more sensing elements 310. In some implementations, the sensing elements 310 may be distributed on two or more semiconductor chips.

The magnetic field may be produced by a magnet, a current-carrying conductor (e.g., a wire, a lead frame, or a busbar), the Earth, or another magnetic field source. A sensing element 310 has a "sensitivity axis" or "sensing axis." The sensing element is sensitive to a magnetic field component of a magnetic field that is projected onto or aligned with the sensitivity axis. Moreover, a sensing element 310 is substantially insensitive to magnetic field components of a magnetic field that are not projected onto or aligned with the sensitivity axis. A magnetic field component may be, for example, an x-magnetic field component Bx, a y-magnetic field component By, or a z-magnetic field component Bz. In the examples described herein, the x-magnetic field component Bx and the y-magnetic field component By are aligned in-plane to the semiconductor chip, and the z-magnetic field component Bz is aligned out-of-plane to the semiconductor chip. Accordingly, the x-magnetic field component Bx and the y-magnetic field component By may be referred to as "in-plane" magnetic field components that are aligned parallel to a chip plane (e.g., a chip surface) of the semiconductor chip. In contrast, the z-magnetic field component Bz may be referred to as an "out-of-plane" magnetic field component that extends out of the chip plane (e.g., a chip surface) of the semiconductor chip. For example, the z-magnetic field component Bz extends perpendicular to the chip plane.

In some implementations, the magnetic field sensor 300 includes multiple sensing elements 310 that are sensitive in two or more different directions. For example, the magnetic field sensor 300 may include a first sensing element configured to sense a first magnetic field component (e.g., the x-magnetic field component Bx), a second sensing element configured to sense a second magnetic field component (e.g., the y-magnetic field component By), and a third Hall-based sensing element configured to sense a third magnetic field component (e.g., the z-magnetic field component Bz). That is, in some implementations, the magnetic field sensor 300 may be a 2D magnetic field sensor or a 3D magnetic field sensor that is configured to sense the magnetic field in multiple dimensions.

The sensing elements 310 may include one or more magnetoresistive-based sensing elements (i.e., magnetoresistive sensing elements) or one or more Hall-based sensing elements (i.e., Hall sensing elements). In some embodiments, the sensing elements 310 may include both one or more magnetoresistive sensing elements and one or more Hall sensing elements.

Magnetoresistance is a property of a magnetoresistive material (e.g., nickel-iron (NiFe)) to change a value of its electrical resistance when a magnetic field is applied to the magnetoresistive material. Thus, the electrical resistance of the magnetoresistive material may depend on a strength and/or a direction of the magnetic field present at the magnetoresistive material. Some examples of various magnetoresistive effects are: giant magneto-resistance (GMR), which is a quantum mechanical magnetoresistance effect observed in thin-film structures composed of alternating ferromagnetic and non-magnetic conductive layers; tunnel magneto-resistance (TMR), which is a magnetoresistive effect that occurs in a magnetic tunnel junction (MTJ), which is a component including two ferromagnets separated by a thin insulator; or anisotropic magneto-resistance (AMR), which is a property of a material in which a dependence of electrical resistance on an angle between a direction of electric current and a direction of magnetization is observed. For example, in the case of AMR sensors, a resistance for an AMR sensing element changes according to a square of a sine of an angle of the magnetic field component projected on the sensitivity axis of the ARM sensing element.

The various magnetoresistive effects are commonly abbreviated as xMR, where the "x" acts as a placeholder for the various magnetoresistive effects. xMR sensors can detect the field orientation of an applied magnetic field by measuring sine and cosine angle components with monolithically integrated magnetoresistive sensing elements.

Magnetoresistive sensing elements of such xMR sensors typically include a plurality of layers, of which at least one layer is a reference layer with a reference magnetization (e.g., a reference direction). The reference magnetization provides a sensing direction that defines the sensitivity axis of a magnetoresistive sensing element. This generally means that the sensitivity axis of the magnetoresistive sensing element is parallel to the chip plane defined by a main surface of the semiconductor chip in which the magnetoresistive sensing element is integrated. As a result, a magnetoresistive sensing element is sensitive to the magnetic field component that extends parallel to, or in-plane with, the main surface of the semiconductor chip. Accordingly, if a magnetic field component points exactly in a same direction as the reference direction, a resistance of the magnetoresistive sensing element is at a minimum and, if the magnetic field component points exactly in the opposite direction with respect to the reference direction, the resistance of the magnetoresistive sensing element is at a maximum.

As a result, the resistance or a voltage drop across the magnetoresistive sensing element resulting from the resistance is proportional to the magnetic field and can be used as the sensor signal of the magnetoresistive sensing element. Moreover, in some implementations, an xMR sensor includes a plurality of magnetoresistive sensing elements, which may have the same or different reference magnetizations.

A Hall sensing element is a transducer that varies an output voltage (e.g., a Hall voltage) in response to a magnetic field. The Hall sensing element may be, for example, a Hall plate through which a current is conducted. The output voltage of the Hall sensing element is based on a Hall effect which makes use of a Lorentz force. The Lorentz force deflects moving charges in a presence of the magnetic field, which is perpendicular to a current flow through the Hall sensing element (e.g., a Hall plate). Thereby, the sensing element can be a thin piece of semiconductor material or metal. The deflection causes a charge separation, which causes a Hall electrical field. This Hall electrical field acts on the charge in an opposite direction to the Lorentz force. Both forces balance each other and create a potential difference perpendicular to a direction of current flow. The potential difference can be measured as the Hall voltage and varies in a linear relationship with the magnetic field.

There are generally two types of Hall sensing elements, including vertical Hall sensing elements and lateral Hall sensing elements. A vertical Hall sensing element (e.g., a vertical Hall plate) is constructed perpendicular to the chip plane defined by the main surface of the semiconductor chip. In particular, the vertical Hall sensing element may be a conductive plate having a sensor plane that extends "vertically" from the main surface of the semiconductor chip into a chip body of the semiconductor chip. The sensitivity axis of the vertical Hall sensing element is perpendicular to the sensor plane. This generally means that the vertical Hall sensing element is sensitive to the magnetic field component that extends parallel to, or in-plane with, the main surface of the semiconductor chip in which the vertical Hall sensing element is integrated. For the vertical Hall sensing element, a voltage value may be output according to a magnetic field flux density in the direction of its sensitivity axis.

On the other hand, a lateral (planar) Hall sensing element (e.g., a lateral Hall plate) is constructed with a sensor plane that is parallel to the chip plane defined by the main surface of the semiconductor chip. In particular, the lateral Hall sensing element may be a conductive plate having a sensor plane that extends laterally along or parallel to the main surface of the semiconductor chip. Since the sensitivity axis of the lateral Hall sensing element is perpendicular to the sensor plane, this generally means that the lateral Hall sensing element is sensitive to magnetic fields vertical, or out-of-plane, to the main surface of the semiconductor chip. For the lateral Hall sensing element, a voltage value may be output according to the magnetic field flux density in the direction of its sensitivity axis.

Accordingly, magnetoresistive sensing elements and vertical Hall sensing elements may be used to measure magnetic fields parallel to the chip plane of the magnetic field sensor 300, and lateral Hall sensing elements may be used to measure magnetic fields perpendicular to the chip plane of the magnetic field sensor 300. Two or more sensing elements and corresponding sensor circuitry may be accommodated (e.g., integrated) in a same semiconductor chip. The sensor circuitry may be referred to as signal processing circuitry and/or signal conditioning circuitry that receives one or more signals (e.g., sensor signals) from one or more sensing elements in the form of raw measurement data, and derives, from the one or more signals, a measurement signal that represents the magnetic field. For example, the sensor circuitry may be configured to condition and amplify the sensor signal of one or more sensing elements 310 via signal processing and/or conditioning.

In some implementations, the sensor circuitry may be configured to combine two or more sensor signals (e.g., by addition, subtraction, or superimposition) to generate a combined sensor signal. For example, a differential sensor signal is one type of combined sensor signal that is representative of a difference between two sensor signals. In some cases, the sensor circuitry may generate the differential sensor signal from the sensor signals generated by two or more sensing elements 310 having a same sensitivity axis (e.g., two sensing elements 310 sensitive to a same magnetic field component) using differential circuitry configured to differentially combine the signals. Sensing elements electrically connected in a half-bridge configuration or in a full-bridge configuration (e.g., a Wheatstone bridge) are examples of differential circuitry that may be used to generate differential sensor signals. Additionally, or alternatively, differential circuitry may include a differential amplifier, an adder, a subtractor, a combiner, logic circuitry, and/or a processor (e.g., a processor that applies differential calculus) to differentially combine the signals to generate a differential sensor signal. Thus, differential sensor signal may by a measurement signal that provides a robustness to homogeneous external stray magnetic fields.

The above-described examples of sensing elements 310 are provided for illustrative purposes and, in practice, the sensing elements 310 may include any type of magnetic field sensing element capable of sensing a characteristic of a magnetic field and enabling a sensor signal to be provided to sensor circuitry.

The ADC 320 may include an analog-to-digital converter that converts an analog signal from one or more sensing elements 310 to a digital signal. For example, the ADC 320 may convert analog signals, received from the set of sensing elements 310, into digital signals (e.g., digital samples) to be processed by DSP 330. The ADC 320 may provide the digital signals to DSP 330. In some implementations, magnetic field sensor 300 may include one or more ADCs 320. For example, different ADCs 320 may be configured to receive analog signals from different sets of sensing elements 310.

The DSP 330 may include a digital signal processing device or a collection of digital signal processing devices. In some implementations, the DSP 330 may receive digital signals from the ADC 320 and may process the digital signals to form output signals (e.g., destined for a controller), such as an output signal that conveys sensor data, as described elsewhere herein. In some implementations, the output signals may be referred to as measurement signals.

The memory element 340 may include a read-only memory (ROM) (e.g., an EEPROM), a random-access memory (RAM), and/or another type of dynamic or static storage device (e.g., a flash memory, a magnetic memory, an optical memory, etc.) that stores information and/or instructions for use by magnetic field sensor 300. In some implementations, the memory element 340 may store information associated with processing performed by DSP 330. Additionally, or alternatively, the memory element 340 may store configurational values or parameters for the one or more sensing elements 310 and/or information for one or more other components of magnetic field sensor 300, such as the ADC 320 or the interface 350.

The interface 350 may include an interface via which magnetic field sensor 300 may receive and/or provide information from and/or to another device in a system, such as a controller. For example, the interface 350 may provide the output signal, determined or otherwise generated by DSP 330, to the controller, and may further receive information from the controller. In some implementations, the interface 350 may be a communication interface that receives the output signals from the DSP 330 and provides the output signals as communication signals according to a communication protocol, which may include transmitting the output signals as the communication signals or generating the communication signals based on the output signals.

As indicated above, FIG. 3 is provided as an example. Other examples may differ from what is described with regard to FIG. 3. The number and arrangement of components shown in FIG. 3 are provided as an example. In practice, the magnetic field sensor 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the magnetic field sensor 300 may perform one or more functions described as being performed by another set of components of the magnetic field sensor 300.

Figure 4:
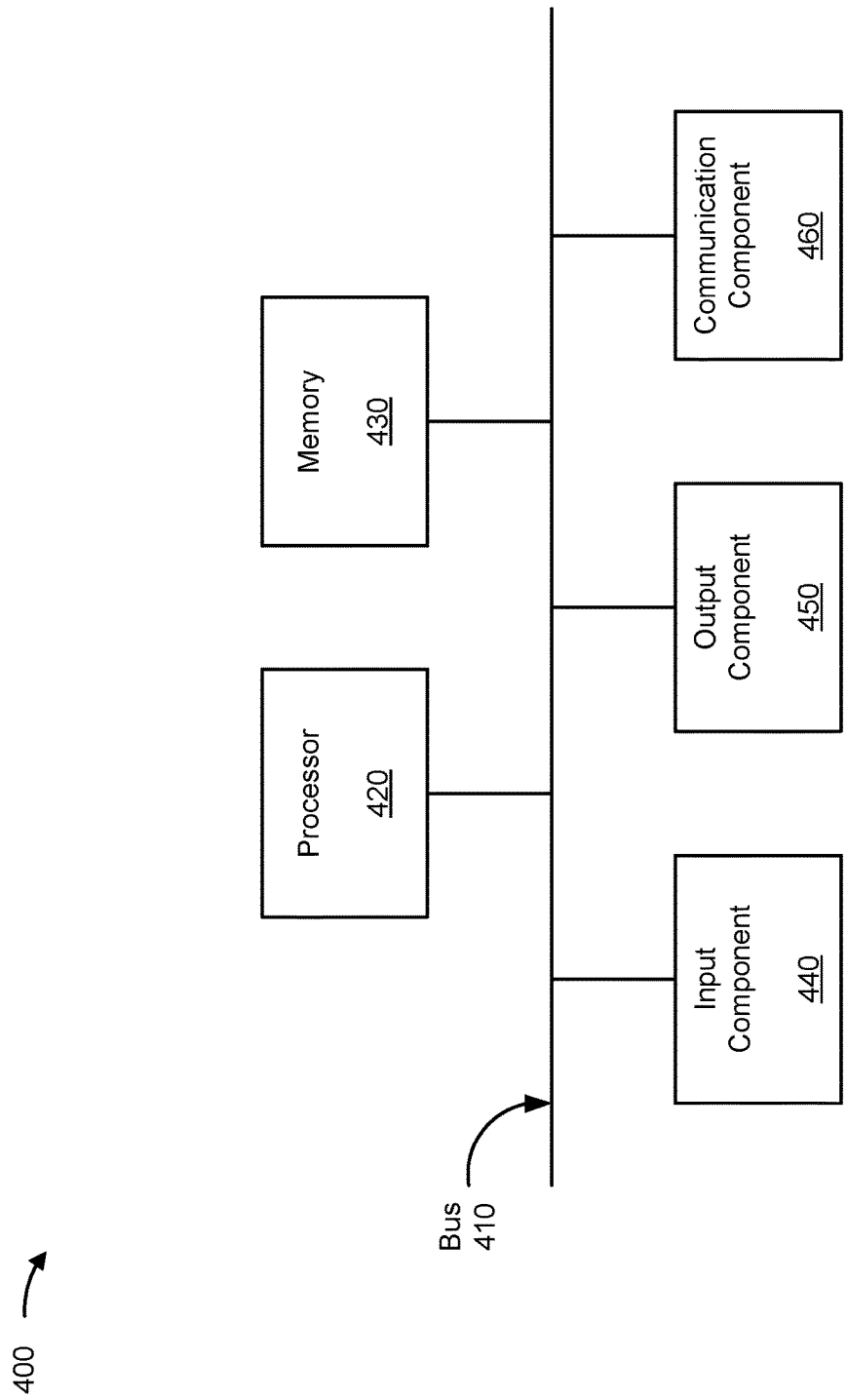
FIG. 4 is a diagram of example components of a device associated with synchronous sampling.

FIG. 4 is a diagram of example components of a device 400 associated with synchronous sampling. The device 400 may correspond to the controller 106. In some implementations, the controller 106 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include RAM, ROM, a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

The following provides an overview of some Aspects of the present disclosure:

Aspect 1: A system, comprising: a first sensor; and a second sensor configured to: receive a trigger associated with synchronizing sampling of a second sensor signal with sampling of a first sensor signal associated with the first sensor, obtain a second sample associated with a second sensor signal based on the trigger, wherein the second sample is synchronous with a first sample associated with the first sensor signal, and transmit an output signal that includes information associated with the second sample.

Aspect 2: The system of Aspect 1, wherein the trigger is received by the second sensor via a digital input pin dedicated to synchronization.

Aspect 3: The system of any of Aspects 1-2, wherein the trigger is transmitted by a controller.

Aspect 4: The system of any of Aspects 1-3, wherein the first sensor is an analog current sensor and the second sensor is a digital angle sensor.

Aspect 5: The system of any of Aspects 1-4, wherein the trigger is a signal associated with initiating analog-to-digital conversion of the first sensor signal.

Aspect 6: The system of any of Aspects 1-5, wherein the first sensor is a digital current sensor and the second sensor is a digital angle sensor.

Aspect 7: The system of any of Aspects 1-6, wherein the first sensor is a first digital angle sensor and the second sensor is a second digital angle sensor.

Aspect 8: The system of any of Aspects 1-7, wherein the first sensor is configured to: receive the trigger associated with synchronizing sampling performed by the second sensor with sampling of the first sensor signal, and obtain a first sample from the first sensor signal based on the trigger.

Aspect 9: The system of any of Aspects 1-8, wherein the trigger is transmitted by the first sensor.

Aspect 10: The system of any of Aspects 1-9, wherein the trigger is transmitted by an inverter included in the system.

Aspect 11: The system of any of Aspects 1-10, wherein the system is a field-oriented control (FOC) system.

Aspect 12: A system, comprising: a first sensor; and a second sensor configured to: receive a sampling trigger, sample a second characteristic signal based on the sampling trigger, wherein the sampling trigger causes the sample of the second characteristic signal to be synchronized with a sample of a first characteristic signal associated with the first sensor, and provide a second output signal that includes information associated with the sample of the second characteristic signal.

Aspect 13: The system of Aspect 12, wherein the sampling trigger is received via a synchronization pin of the second sensor.

Aspect 14: The system of any of Aspects 12-13, wherein the sampling trigger is provided by a controller of the system.

Aspect 15: The system of any of Aspects 12-14, wherein the sampling trigger is a signal associated with initiating analog-to-digital conversion of the first characteristic signal.

Aspect 16: The system of any of Aspects 12-15, wherein the first sensor is configured to: receive the sampling trigger, sample the first characteristic signal based on the sampling trigger, and provide a first output signal that includes information associated with the sample of the first characteristic signal.

Aspect 17: The system of any of Aspects 12-16, wherein the sampling trigger is provided by the first sensor.

Aspect 18: The system of any of Aspects 12-17, wherein the sampling trigger is received from an inverter included in the system.

Aspect 19: The system of any of Aspects 12-18, wherein the system is a field-oriented control (FOC) system associated with performing motor control.

Aspect 20: A field-oriented control (FOC) system, comprising: a current sensor; and an angle sensor configured to: receive a trigger associated with synchronizing sampling of an angle sensor signal with sampling of a current sensor signal associated with the current sensor; sample the angle sensor signal based on the trigger, wherein the sample of the angle sensor signal is synchronous with a sample of the current sensor signal; and transmit an output signal that includes information associated with the sample of the angle sensor signal.

Aspect 21: A method comprising performing one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
a first analog current sensor configured to generate a first sensor signal based on measuring a phase current of an electric motor; and
a second digital angle sensor configured to:
generate a second sensor signal based on measuring an angular position of a rotor of the electric motor;
receive a trigger associated with synchronizing sampling of a second sensor signal with sampling of the first sensor signal associated with the first analog current sensor,
obtain a second sample associated with a second sensor signal based on the trigger, wherein the second sample is synchronous with a first sample associated with the first sensor signal, and
transmit an output signal that includes information associated with the second sample; and
a controller comprising:
an analog-to-digital converter (ADC) configured to acquire samples of the first sensor signal; and
a timer component configured to generate the trigger to trigger the ADC to sample the first sensor signal to obtain the first sample associated with the first sensor signal and to trigger the second digital angle sensor to sample the second sensor signal to obtain the second sample associated with a second sensor signal,
wherein the controller is configured to receive the output signal, and perform field-oriented control (FOC) to control the phase current of the electric motor based on the first sample and the information associated with the second sample.

2. The system of claim 1, wherein the trigger is received by the second digital angle sensor via a digital input pin dedicated to synchronization.

3. The system of claim 1, wherein the trigger is a signal associated with initiating analog-to-digital conversion of the first sensor signal.

4. The system of claim 1, wherein the trigger is transmitted by an inverter included in the system.

5. The system of claim 1, wherein the system is a field-oriented control (FOC) system.

6. A system, comprising:
a first angle sensor arranged at a first axis position relative to a rotatable magnet for sensing an angular position of the rotatable magnet,
wherein the first angle sensor is configured to generate a first sensor signal based on sensing the angular position of the rotatable magnet,
wherein the first angle sensor includes a first analog-to-digital converter (ADC) configured to acquire samples of the first sensor signal based on a sampling trigger;
a second angle sensor arranged at a second axis position relative to the rotatable magnet for sensing the angular position of the rotatable magnet,
wherein the second angle sensor is configured to measure the angular position of the rotatable magnet with an angular offset relative to the first angle sensor,
wherein the second angle sensor is configured to generate a second sensor signal based on sensing the angular position of the rotatable magnet,
wherein the second angle sensor includes a second ADC configured to acquire samples of the second sensor signal based on the sampling trigger, wherein the sampling trigger causes the samples of the second sensor signal to be synchronized with the samples of the first sensor signal; and
a controller configured to:
receive a first sample from the first ADC and a second sample from the second ADC, the first sample and the second sample being synchronous samples triggered by the sampling trigger,
apply an angular compensation to the first sample based on the angular offset to generate a compensated first sample,
compare the compensated first sample and the second sample to determine a difference between the compensated first sample and the second sample, and
generate an indication based on whether the difference between the compensated first sample and the second sample satisfies an error threshold.

7. The system of claim 6, wherein the sampling trigger is received by the first angle sensor via a first synchronization pin of the first angle sensor and by the second angle sensor via a second synchronization pin of the second angle sensor.

8. The system of claim 6, wherein the sampling trigger is provided by a controller of the system.

9. The system of claim 6, wherein the sampling trigger is provided by the first angle sensor.

10. The system of claim 6, wherein the system is a field-oriented control (FOC) system associated with performing motor control.

11. The system of claim 6, wherein the controller includes a timer component configured to generate the sampling trigger to trigger the first ADC to sample the first sensor signal to obtain the first sample and to trigger the second ADC to sample the second sensor signal to obtain the second sample.

* * * * *